(12) United States Patent
Potier et al.

(10) Patent No.: US 12,545,396 B2
(45) Date of Patent: Feb. 10, 2026

(54) FLIGHT CONTROL SURFACE ACTUATION SYSTEM

(71) Applicant: Goodrich Actuation Systems SAS, Vernon (FR)

(72) Inventors: Karl Potier, Paris (FR); Raphael Medina, Pierrefitte sur Seine (FR); Quentin Ricard, Eaubonne (FR)

(73) Assignee: GOODRICH ACTUATION SYSTEMS SAS, Vernon (FR)

( * ) Notice: Subject to any disclaimer, the term of this patent is extended or adjusted under 35 U.S.C. 154(b) by 140 days.

(21) Appl. No.: 18/619,977

(22) Filed: Mar. 28, 2024

(65) Prior Publication Data
US 2024/0326985 A1  Oct. 3, 2024

(30) Foreign Application Priority Data

Mar. 28, 2023  (EP) ..................................... 23305418

(51) Int. Cl.
*B64C 13/28* (2006.01)
*B64D 45/00* (2006.01)

(52) U.S. Cl.
CPC .......... *B64C 13/28* (2013.01); *B64D 45/0005* (2013.01)

(58) Field of Classification Search
CPC ......... B64D 45/00; B64C 13/00; B64C 13/24; B64C 13/28
See application file for complete search history.

(56) References Cited

U.S. PATENT DOCUMENTS

| | | | |
|---|---|---|---|
| 8,438,743 B2 | 5/2013 | Wallen et al. | |
| 10,421,532 B2 | 9/2019 | Schwartz | |
| 10,633,080 B2* | 4/2020 | Huynh | B64C 13/36 |
| 2010/0207616 A1* | 8/2010 | Cook | G01D 21/00 |
| | | | 324/207.25 |
| 2021/0155340 A1 | 5/2021 | Ito et al. | |

FOREIGN PATENT DOCUMENTS

CN   113353283 A    9/2021
JP   2013525191   *  6/2013

OTHER PUBLICATIONS

Abstract for CN113353283 (A), Published: Sep. 7, 2021, 1 page.
European Search Report for Application No. 23305418.8, mailed Sep. 4, 2023, 10 pages.

* cited by examiner

*Primary Examiner* — Joshua D Huson
*Assistant Examiner* — Anna L. Gordon
(74) *Attorney, Agent, or Firm* — CANTOR COLBURN LLP

(57) ABSTRACT

A flight control surface actuation system includes a rotary actuator having an output part configured to rotate about an axis (R-R), a connecting rod for connecting a flight control surface to the rotary actuator, and a connection mechanism connecting a first end of the connecting rod to the output part such that rotation of the output part about the axis causes at least part of the connection rod to rotate about the axis. The connection mechanism comprises a connection structure fixed to the output part and an engagement part mounted for rotation about a longitudinal axis. The engagement part extends through the connecting rod and is fixed to it. A position sensor is arranged to measure the angular displacement of the first end of the connecting rod about the axis.

14 Claims, 4 Drawing Sheets

FLIGHT CONTROL SURFACE ACTUATION SYSTEM

CROSS REFERENCE TO RELATED APPLICATIONS

This application claims priority to European Patent Application No. 23305418.8 filed Mar. 28, 2023, the entire contents of which is incorporated herein by reference.

TECHNICAL FIELD

The present disclosure relates to a flight control surface actuation system, a connecting rod and a position sensor for use in such a system.

BACKGROUND

It is known to use rotary actuators to control the position of flight control surfaces on an aircraft. An example of a flight control surface is a spoiler, which is positioned on a trailing edge of an aircraft wing. The spoiler can be extended upwardly, from a stowed position flush to the wing to a raised position, to reduce the lift created by the wing. In order to connect the rotary output shaft to the flight control surface, it is common to use an elongate connecting rod.

In prior art rotary actuators, it is known to provide some sort of position sensor on the actuator output shaft to determine the angular displacement thereof, which in turn, allows the position of the flight control surface to be determined.

SUMMARY

Embodiment of the present disclosure may provide an improved connecting rod and actuation system.

According to a first aspect of this disclosure, there is provided a flight control surface actuation system comprising: a rotary actuator having an output part configured to rotate about an axis; a connecting rod for connecting a flight control surface to the rotary actuator; a connection mechanism connecting a first end of the connecting rod to the output part such that rotation of the output part about the axis causes at least part of the connection rod to rotate about the axis, the connection mechanism comprising: a connection structure fixed to the output part; and an engagement part mounted for rotation about a longitudinal axis thereof relative to the connection structure, wherein the engagement part extends through the connecting rod and is fixed thereto; and a position sensor arranged to measure the angular displacement of the first end of the connecting rod about the axis, wherein a first part of the position sensor is secured to the connection structure in a fixed position, and wherein a second part of the position sensor is rotatably mounted to the first part and is configured to rotate with the engagement part and the connecting rod, wherein the position sensor is configured to measure the relative rotation between the first and second parts of the position sensor.

In any example of the disclosure, the connection structure may comprise: a first arm; and a second arm axially spaced from the first arm, wherein the first and second arms extend radially outwardly from the output part, and wherein the engagement part extends axially between the first and second arms and is rotatably mounted to the first arm and the second arm.

In any example of the disclosure, the connection mechanism may comprise means for applying an axial load to the engagement part and/or to the connecting rod.

In any example of the disclosure, the means for applying an axial load to the engagement part and/or to the connecting rod may comprise means for limiting axial movement of the engagement part relative to the second arm and a nut for turning on a threaded surface of the engagement part to tighten the nut relative to the first arm.

In any example of the disclosure, the engagement part may comprise a first conical portion which tapers in a first axial direction, wherein the first conical portion may form a first friction surface engaged with a corresponding first connecting rod friction surface.

In any example of the disclosure, a second conical portion axially spaced from the first conical portion may be provided on the engagement part, wherein the second conical portion may taper in a second axial direction opposite to the first axial direction, wherein the second conical portion may form a second friction surface engaged with a corresponding second connecting rod friction surface.

In any example of the disclosure, the second conical portion may be formed on a spacer extending between the engagement part and the connecting rod, wherein the spacer may be limited in axial movement relative to the engagement part in the second axial direction.

In any example of the disclosure, the longitudinal axis of the engagement part may extend across the diameter of the connecting rod.

In any example of the disclosure, the position sensor may be mounted adjacent the connection structure such that the second part of the position sensor may be configured to rotate about the longitudinal axis of the engagement part.

In any example of the disclosure, the first part of the position sensor may be fixed to the second arm and extend axially away from the engagement part.

In any example of the disclosure, the connecting rod may comprise a second end configured to be operatively connected to a flight control surface.

In any example of the disclosure, the second part of the position sensor may comprise a sensor shaft that is operatively connected to the connecting rod and that is rotatably mounted to the connection structure.

From a further aspect of the disclosure, an aircraft is provided, the aircraft comprising: at least one flight control surface; and a flight control surface actuation system as claimed in any preceding claim, wherein said connecting rod is connected to said flight control surface.

In any example of the disclosure, flight control surface may be a spoiler.

From a still further aspect of the disclosure, a method of controlling a flight control surface is provided, the method comprising using a flight control surface actuation system according to any example of the disclosure to vary the position of a flight control surface.

BRIEF DESCRIPTION OF DRAWINGS

Certain examples of the disclosure will now be described by way of example only and with reference to the accompanying drawings in which.

DETAILED DESCRIPTION

Figure 1:
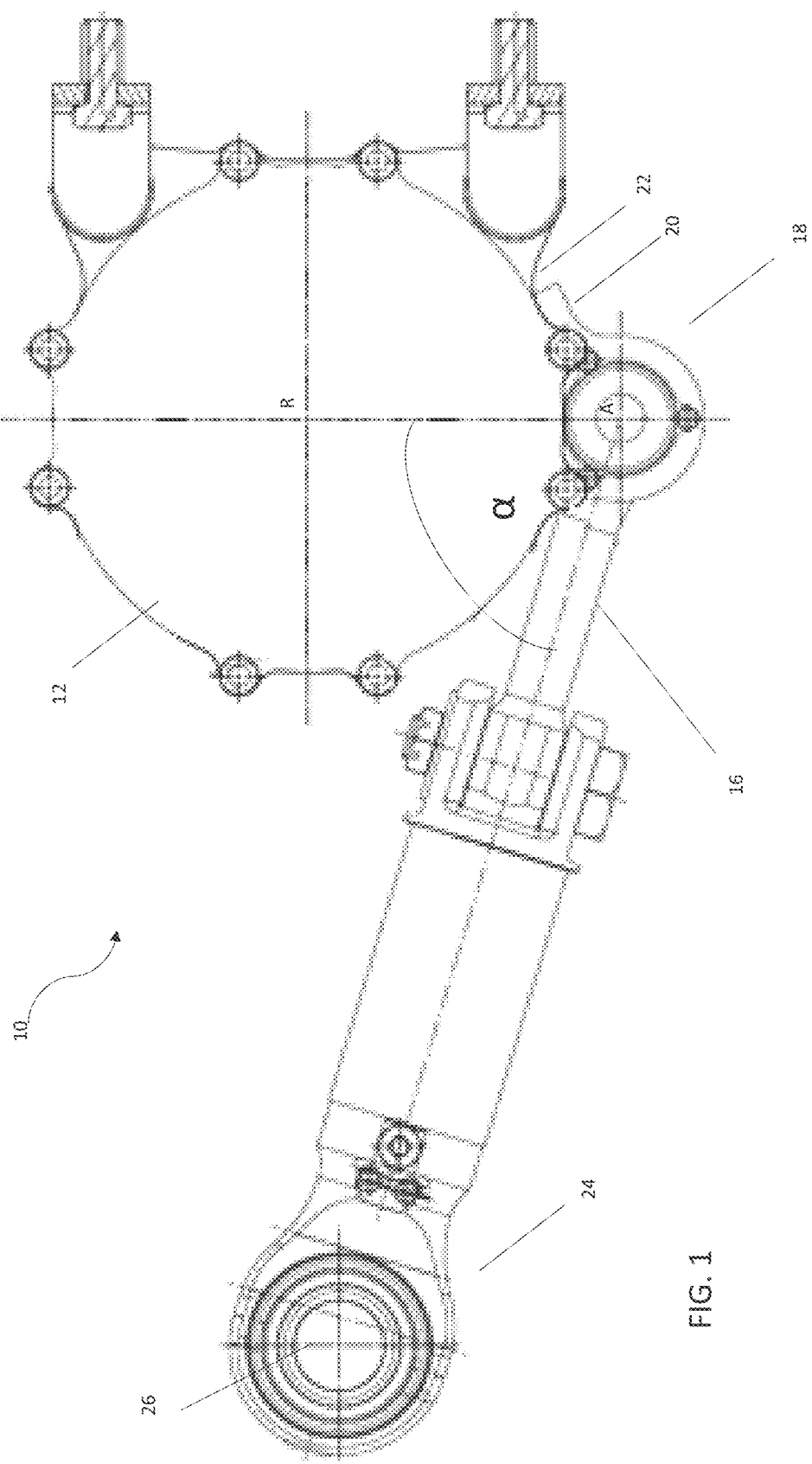
FIG. 1 is a schematic plan view of an exemplary flight control surface actuation system.
Figure 2:
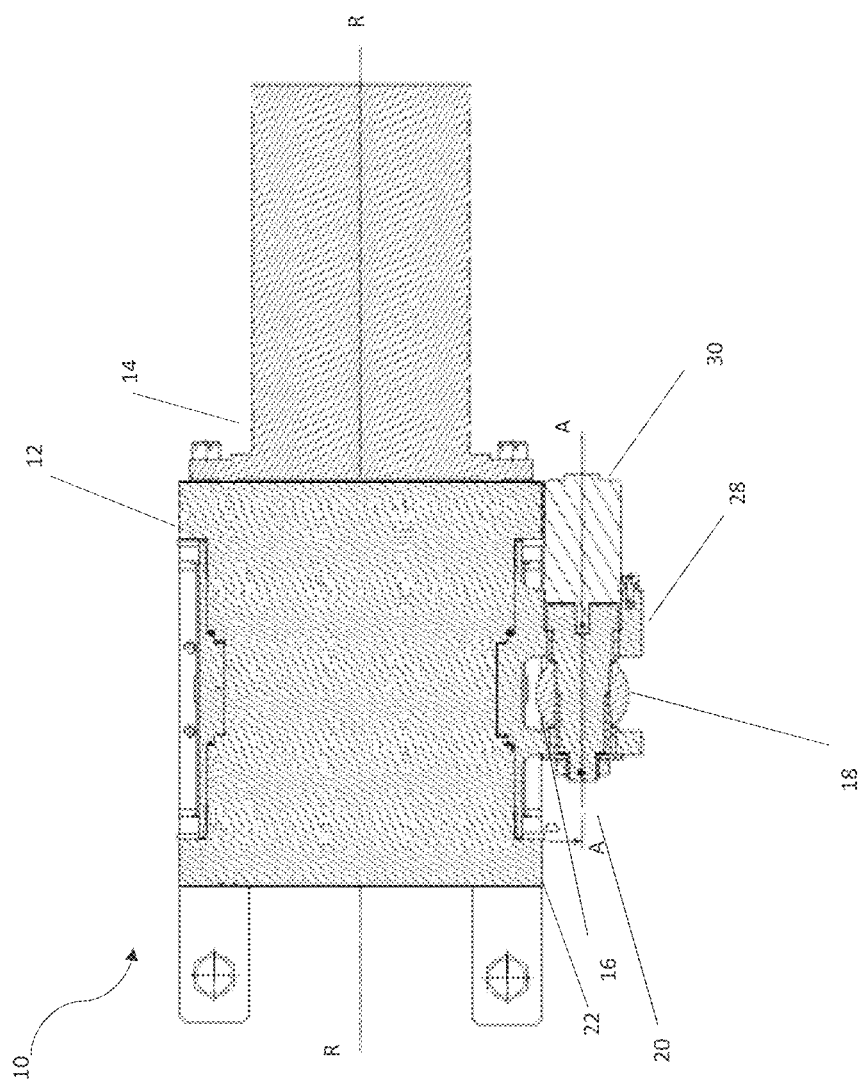
FIG. 2 is a schematic side view of another exemplary flight control surface actuation system.

FIG. 1 is a schematic plan view of an exemplary flight control surface actuation system 10 according to an example of the present disclosure. FIG. 2 is a schematic side view of another exemplary flight control surface actuation system 10 according to an example of the present disclosure. In any example of the disclosure, the system 10 comprises a rotary actuator 12 having an output part 20 rotatable around an axis R-R extending through the actuator 12 when driven by a motor 14.

A connecting rod 16 is used to control the position of a flight control surface (not shown) connected thereto, as is known in the art. The flight control surface may be, for example, a spoiler on an aircraft wing.

A first end 18 of the connecting rod 16 is connected to the output part 20 of the actuator 12 via a connection mechanism so as to rotate around an axis A-A extending through the first end 18 of the connecting rod 16 when the actuator 12 is driven by the motor 14. In any example of the disclosure, the actuator 12 may include a gear system (not shown) for multiplying the rotary output of the motor 14. In any example of the disclosure, the output part 20 of the actuator 12 may comprise or be an output ring of the actuator and may be located adjacent to or proximate a radially outer surface 22 or part of the actuator 12.

A second end 24 of the connecting rod 16 is configured to be connected to a flight control surface (not shown), for example via an eye 26.

A position sensor 30 (as seen for example in FIG. 2) is provided adjacent to the first end 18 of the connecting rod 16 and is arranged to measure the position of the connecting rod 16 relative to the rotational axis R-R of the rotary actuator 12. As seen in FIG. 1, at least in some examples of the disclosure, the position sensor 30 is configured to measure the angle α between the centre of rotation of the rotary actuator 12 (along axis R-R), the centre of rotation of the connecting rod 16 (along axis A-A) and the second end 24 of the connecting rod 16. Measuring the position of the connecting rod 16 about the axis R-R (i.e. the angular displacement of the first end 18 of the connecting rod 16 relative to the axis R-R) enables the extension of a flight control surface (not shown) connected to the connecting rod 16 to be determined. At least in some examples, an almost linear correlation may be used to determine the extension or position of a flight control surface from the measured angular displacement of the first end 18 of the connecting rod 16 relative to the axis R-R (which, at least in some examples, may correspond to the angle α described above).

Figure 3:
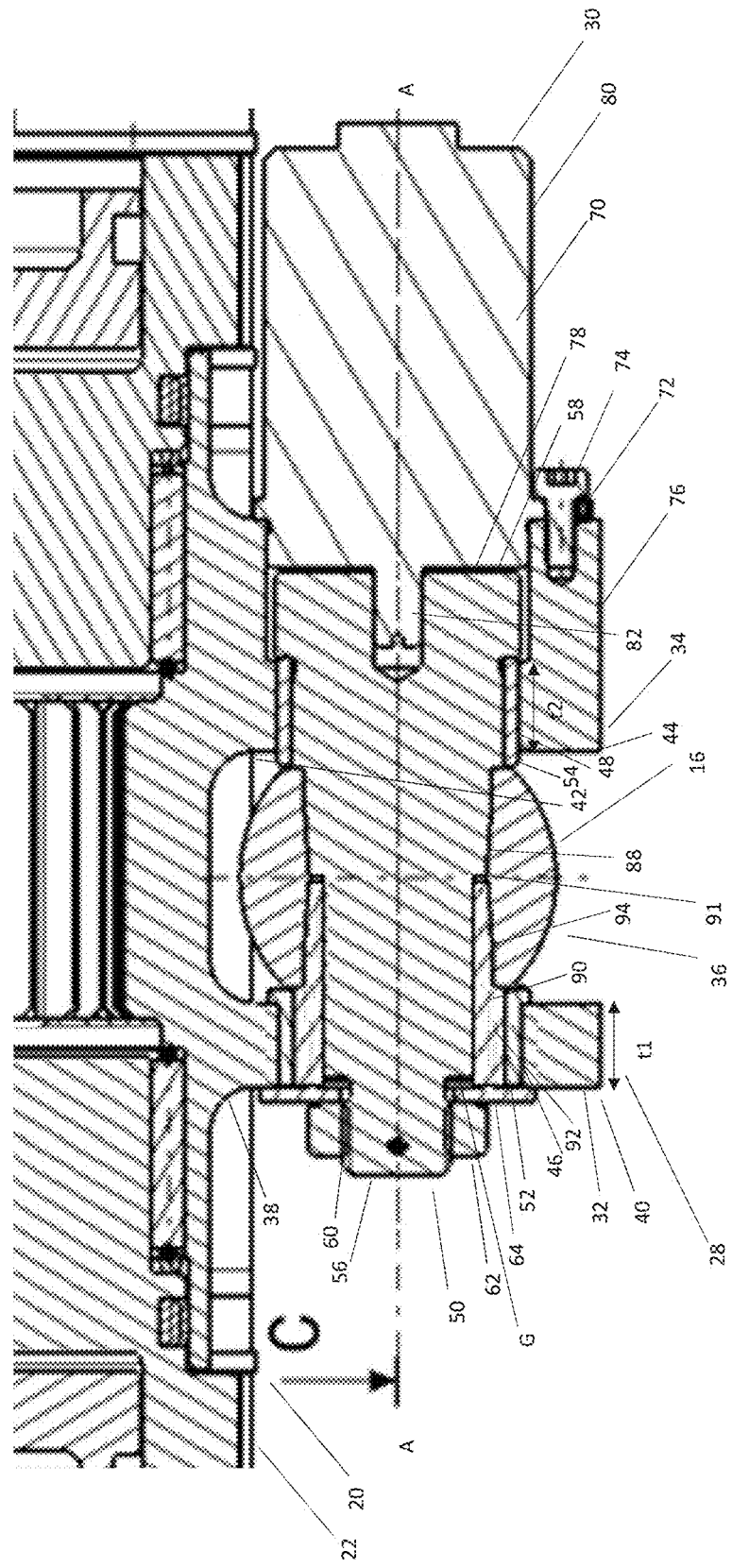
FIG. 3 is an enlarged schematic view of part of the side view of FIG. 2.

As seen more clearly in FIG. 3, the connection mechanism comprises a connection structure 28 to which the connecting rod is rotatably connected by an engagement part 50. The connection structure 28 may include a first arm 32 and a second arm 34. The first 32 and second 34 arms extend radially outwardly from the radially outer part 20 of the actuator 12. It will be understood that in any example of the disclosure, the radial direction is defined as a direction extending perpendicular to an axis of rotation, in this case the axis R-R. In any example of the disclosure, the connection structure 28 can be connected to the radially outer part 20 of the actuator 12 by any suitable means including by welding or by being bolted or riveted thereto. Alternatively, in any example of the disclosure, the connection structure 28 can be formed as an integral part the radially outer part 20 of the actuator 12. For example, the connection structure 28 can be cast or machined together with an output ring of the actuator 12 to form a single component part.

The first 32 and second 34 arms are spaced from each other in an axial direction (where the axial direction is the direction of the axis of rotation R-R) such that a gap 36 is formed between the first 32 and second 34 arms and the radially outer part 20 of the actuator 12. Thus, the first 32 and second 34 arms and the radially outer part 20 of the actuator 12 form a clevis type arrangement. In this arrangement, a first end 38 of the first arm 32 is connected to or integral with the outer part 20 of the actuator 12 and a second end 40 of the first arm 32 which is radially removed from the first end 38 is a free end. (In other words the second end 40 is not connected to any other structure). A first end 42 of the second arm 34 is also connected to or integral with the output part 20 of the actuator 12 and a second end 44 of the second arm 34 (which is radially removed from the first end 42) is a free end. (In other words the second end 44 is not connected to any other structure).

A first aperture 46 extends through the first arm 32 and is spaced from both the first and second ends 38, 40 of the first arm 32. A second aperture 48 extends through the second arm 34 and is spaced from both the first and second ends 42, 44 of the second arm 34. In any example of the disclosure, the first aperture 46 may extend through the first arm 32 in an axial direction (where the axial direction is a direction parallel to the axis of rotation A-A of the connecting rod 16). In any example of the disclosure, the second aperture 48 may extend through the second arm 34 in an axial direction (where the axial direction is a direction parallel to the axis of rotation A-A of the connecting rod 16). In any example of the disclosure, the first arm 32 may have a thickness t1 in the axial direction. In any example of the disclosure, the second arm 34 may have a thickness t2 in the axial direction. One or both of the thicknesses t1 and t2 may be constant over part or substantially all the radial extent of the first and second arms 32, 34. In any example of the disclosure, the first arm 32 may have a depth (not shown) in a direction perpendicular to both the axial and the radial directions. In any example of the disclosure, the second arm 34 may have a depth (not shown) in a direction perpendicular to both the axial and the radial directions.

Both the first and second apertures 46, 48 may be circular in cross section. In any example of the disclosure, one or both of the first and second apertures 46, 48 may have a constant cross section along the respective thickness t1, t2 of the first and second arms 32, 24. In any example of the disclosure, one or both of the first and second apertures 46, 48 may form a cylindrical passage extending through the respective thickness t1, t2 of the first and second arms 32, 24. It will be understood that such a cylindrical passageway may provide a relatively low friction sliding support for a component engaging with the cylindrical passageway. In any example of the disclosure, one or both of first and second apertures 46, 48 may be centred on the axis of rotation A-A of the connecting rod 16 as will become apparent from the description below.

The engagement part 50 can be approximately pin shaped and is configured to extend across the gap 36, through the first and second apertures 46, 48 and through the connecting rod 16 so as to mount the connecting rod 16 to the connection structure 28 such that the connecting rod 16 (and the engagement part 50) can rotate relative to the first and second arms 32, 24 about the axis of rotation A-A of the connecting rod 16. As seen in FIG. 3 for example, a first bushing 52 can be provided in the first aperture 46 so as to be located between the first arm 32 and the engagement part 50. A second bushing 54 can be provided in the second aperture 48 so as to be located between the second arm 34 and the engagement part 50. It will be understood that any suitable bushing, bearing or other means which allows relative rotation between the first arm 32 or the second arm 34 and the engagement part 50 could be used. In any example of the disclosure, the first bushing 52 and/or the second bushing 54 can be a copper bushing.

The engagement part 50 has a longitudinal extent and extends coaxially with the axis of rotation A-A of the connecting rod 16 so as to rotate about the axis of rotation A-A of the connecting rod 16. The engagement part 50 has a first engagement part end 56 at a first longitudinal end thereof. The engagement part 50 has a second engagement part end 58 at a second longitudinal end thereof, opposite to and spaced from the first engagement part end 56.

A connector is provided for fixing the engagement part 50 in the axial direction relative to the first arm 32. In any example of the disclosure, the connector may include a threaded portion 60 provided on a radially outer surface of the engagement part 50 proximate the first engagement part end 56 and a threaded nut 62. The first engagement part end 56 and the threaded portion 60 may extend axially beyond the first arm 32. The threaded nut 62 is threaded onto the threaded portion 60. A washer 64 may be provided to extend between the first arm 32 and the threaded nut 62 if desired. It will be understood that when the threaded nut 62 is screwed onto the threaded portion 60, this may act to hold the engagement part 50 in position axially relative to the first arm 32.

The second engagement part end 58 may extend axially beyond the second arm 34 and may extend in a direction opposite to the first engagement part end 56.

The position sensor 30 comprises a sensor housing 70, mounted to the connection structure 28 in a fixed manner so that it cannot rotate relative thereto and will move together with the connection structure 28. In any example of the disclosure, the sensor housing 70 may be fixed to the connection structure 28 by any suitable fastening means such as for example, a weld or one or more screws, rivets or bolts. In any example of the disclosure, the sensor housing 70 may include a flange 72 configured to abut against the second arm 34. In any example of the disclosure, the flange 72 may extend radially outwardly from the sensor housing 70 at any desired axial position along the sensor housing. The flange 72 may be fixed to the second arm 34 by one or more fastening means 74, for example screws. In any example of the disclosure, the sensor housing 70 may be fixed to the second arm 34 by two or more, in one example three, fastening means 74 which are spaced apart from one another. In any example of the disclosure, the two or more fastening means can be spaced apart along the depth of the second arm 34. In any example of the disclosure, the second end 44 of the second arm 34 may include a lip 76 which extends perpendicular to the radial direction (in other words, the lip extends in the axial direction). The lip 76 may extend beyond the second engagement part end 58 and may abut against the flange 72.

At least in some examples, the sensor housing 70 may have a first sensor housing end 78 which is positioned adjacent to or in abutment with the second engagement part end 58. The flange 72 may be axially spaced from the first sensor housing end 78. The flange 72 may include one or more apertures (not shown) for receiving the fastening means 74. In any example of the disclosure, the flange 72 may only extend along a first side wall 80 of the sensor housing 70 or may extend along two or more side walls of the sensor housing 70.

In any example of the disclosure, the position sensor 30 may comprise a sensor shaft 82, rotatably connected to the sensor housing 70. The sensor shaft 82 may extend axially from the first sensor housing end 78 to engage with the engagement part 50 for rotation therewith. During rotation of the sensor shaft, the sensor housing 70 remains fixed to the connection structure 28, thus the sensor shaft 82 rotates relative to the sensor housing 70. As the sensor shaft 82 rotates, a signal indicative of the amount of rotation is generated by the position sensor 30, as is known in the art. This signal is used to indicate the position of the connecting rod 16 and, in turn, the flight control surface (not shown). In this example, the position sensor 30 is a Rotary Variable Differential Transformer (RVDT). However, any suitable position sensor may be used, for example, a contactless Hall-effect sensor or a potentiometer.

Mounting the position sensor 30 to the connection structure 28 may remove the need for a sensor to be housed within or on the rotary actuator 12. This may reduce the size of the actuator 12 and make the sensor 30 easier to access and replace. Furthermore, since the connecting rod 16 is loaded directly in tension/compression during use, integrating a load sensor 30 thereon allows easier and more accurate measurements thereof, without having to account for any actuator internal friction.

Figure 4:
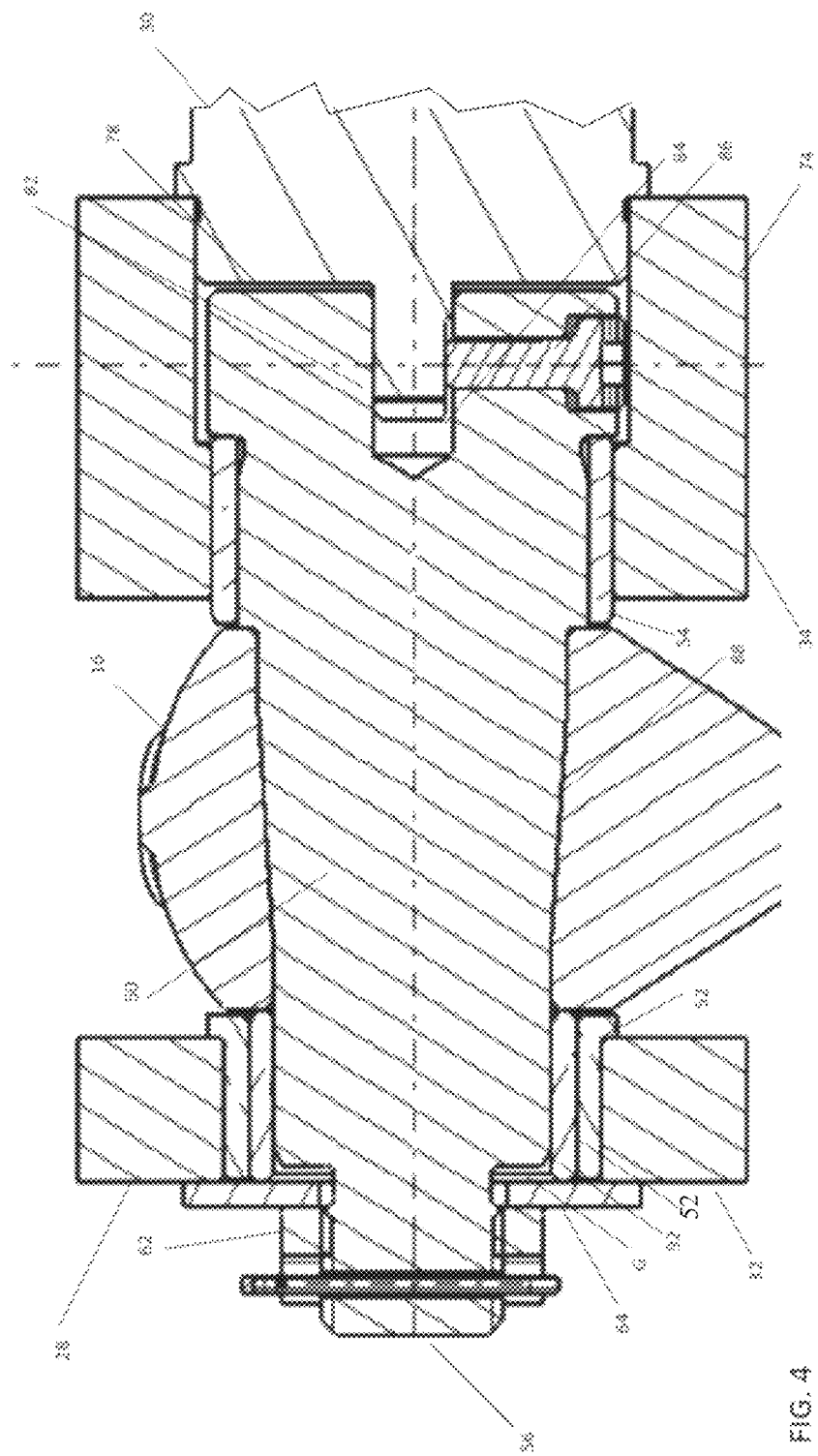
FIG. 4 is an enlarged view of part of a side view of another exemplary flight control surface actuation system.

FIG. 4 is an enlarged view of part of the view of FIG. 3 in which the engagement between the sensor shaft 82 and the engagement part 50 can be seen in greater detail. As seen, the sensor shaft 82 and the engagement part 50 are mounted coaxially such that both will rotate about the axis of rotation A-A. A tubular or cylindrical opening 84 is provided in the engagement part 50 which extends axially into the body of the engagement part 50 along the rotation axis A-A from the second engagement part end 58. A screw 86 is provided which extends through the engagement part 50 in a radial direction and which is tightened against the sensor shaft 82 so as to fix the sensor shaft 82 relative to the engagement part 50.

In various applications including in aerospace applications such as the movement of control surfaces in aircraft, it is desirable to be able to measure relative rotation very accurately. Any backlash or free play present in the connection between the position sensor, the actuator and the connecting rod may introduce errors in the measurements obtained and so it is desirable to reduce or eliminate any such errors. At least in some examples, it is desired to measure an angle of rotation to an accuracy of 0.3° or more. To achieve this In the arrangement according to the disclosure, this is achieved by using a conical friction surface for connecting the connecting rod 16 to the engagement part 50 as will be described in further detail below.

As seen in FIGS. 3 and 4, a passageway is formed through the connecting rod 16, through which the engagement part 50 extends so as to connect the connecting rod 16 to the connection structure 28. A conical portion 88 may be provided on the engagement part 50 which tapers radially inwardly along a portion of the engagement part in a first axial direction towards the first engagement part end 56 to form a tapered radially outer surface (or first friction surface) of the engagement part, the diameter thereof reducing in the axial direction moving towards the first engagement part end 56. The tapered radially outer surface of the conical portion 88 engages with a surface of the passageway which forms a corresponding first connecting rod friction surface. As the screw 62 is tightened on the threaded portion 60 to push against the spacer 90, an axial load (not shown) is applied to the engagement part 50. The axial load will result in a friction force or torque along the tapered radially outer surface of the conical portion 88. This friction force will act to hold the engagement part 50 and the connecting rod 16 together.

In any example of the disclosure, to provide an accurate reading from the position sensor 30, it is desirable for the sliding torque in the bushings 52, 54 to be less than the frictional force along the tapered radially outer surface of the conical portion 88. In any example of the disclosure, the minimum transmittable torque along the tapered radially outer surface of the conical portion 88 will depend on the tan of the angle of the tapered surface as well as the size of the axial preload and the coefficient of friction of the conical portion 88. At least in some examples, the angle of the tapered surface to the longitudinal axis A-A should be between about 0° and 15°, for example between about 4° and 5°.

In any example of the disclosure, only one tapered surface may be provided as described above. However, in any example of the disclosure, a further tapered surface which tapers in a second axial direction, typically the opposite axial direction to the tapered surface of the conical portion 88 may also be provided. The further tapered surface could be provided on the engagement part 50 by forming the engagement part 50 to include a second conical portion (not shown) which tapers radially inwardly along a portion of the engagement part in an axial direction away the first engagement part end 56 to form a tapered radially outer surface of the engagement part (a friction surface), the diameter thereof reducing in the axial direction moving away the first engagement part end 56. The conical portion 88 and the further conical portion could join to form a waisted section (not shown) of the engagement part 50. However, in other examples, as described further below, the further tapered surface could be provided on the engagement part 50 by a conical spacer 90 engaged with the engagement part 50, the conical spacer providing a second conical portion for engagement with the connecting rod.

In any example, a spacer (90 in FIG. 3) may be provided between the first bushing 52 and the engagement part 50. The spacer 90 may be configured to extend through the first bushing 52 and to project axially beyond the first bushing 52 such that, when the threaded nut 62 is screwed onto the threaded portion 60 as described above, a first axial end of the spacer may be in contact with the washer 64 and a gap G may be provided between the first arm 32 and the washer 64. It will be understood that the axial load provided by tightening the nut 62 will therefore be transferred into the spacer 90. The spacer 90 may then be configured to push axially against the connecting rod 16 such that the connecting rod 16 pushes axially against the engagement part 50.

In some examples and as seen in FIG. 3, the spacer may be a conical spacer 90 provided between the first bushing 52 and the engagement part 50. The conical spacer may be configured to provide a further tapered surface which tapers in the opposite axial direction to the tapered surface of the conical portion 88 of the engagement part 50. The conical spacer 90 forms a tube within which part of the longitudinal extent of the engagement part 50 is received. A passageway is formed through the connecting rod 16, through which the engagement part 50 extends so as to connect the connecting rod 16 to the connection structure 28. A first longitudinal section 92 of the conical spacer 90 has a substantially constant radially outer diameter and is configured to abut against the radially inner surface of the first bushing 52. A second longitudinal section 94 of the conical spacer 90 has a tapered radially outer surface such that the diameter thereof reduces in the axial direction moving away from the first longitudinal section 92. The second longitudinal section 94 extends into the passageway through the connecting rod 16 such that the tapered radially outer surface of the conical spacer 90 engages with a surface of the passageway. It will be understood that when the first aperture 46 forms a cylindrical passageway as described above, this may provide a relatively low friction sliding support for the first engagement part end 56 and the first longitudinal section 92 of the conical spacer 90 or any other spacer according to any example of the disclosure.

As the screw 62 is tightened on the threaded portion 60 to push against the first arm 32, an axial load (not shown) is applied to the conical spacer 90 and the engagement part 50. In the example shown in FIG. 3, the engagement part 50 may include a radially extending shoulder 91 which acts to limit axial movement of the conical spacer 90 relative to the engagement part 50 in the second axial direction (in other words, in the direction of the axial load). The axial load will result in a friction force along the tapered radially outer surface of the conical spacer 90. This friction force will act to hold the engagement part 50 and the connecting rod 16 together.

It will be understood that in examples having a first and further tapered surface which taper in opposite directions such as, for example is shown in FIG. 3, the loads transferred into the connecting rod 16 from the tapered surfaces may be balanced or may even cancel each other out.

In other examples in which only a single conical surface 88 is provided, as shown in FIG. 4, the spacer 90 again forms a tube within which part of the longitudinal extent of the engagement part 50 is received. A passageway is formed through the connecting rod 16, through which the engagement part 50 extends so as to connect the connecting rod 16 to the connection structure 28. A first longitudinal section 92 of the conical spacer 90 has a substantially constant radially outer diameter and is configured to abut against the radially inner surface of the first bushing 52. will be understood that when the first aperture 46 forms a cylindrical passageway as described above, this may provide a relatively low friction sliding support for the first engagement part end 56 and the first longitudinal section 92 of the conical spacer 90 or any other spacer according to any example of the disclosure.

The position sensor 30 comprises a wire output port (not shown) for receiving a wire (not shown) connected to an electronic module (not shown). The electronic module is configured to receive position and load signals from the sensor 30 and transmit signals wirelessly or through wires (not shown) to a flight computer and/or to a control unit in the rotary actuator 12. This allows feedback from the sensor 30 to be used in controlling the amount of actuation of a flight control surface.

In operation, when flight control surface actuation is required, the rotary actuator 12 is activated to rotate the connection mechanism around axis R. As described above, the first end 18 of the connecting rod 16 is rotatably connected to the connection structure 28 and the connecting rod 16 is free to rotate around this connection point, such that as the first end 18 rotates around the axis R due to the rotation of the connection structure 28, the connecting rod 16 pivots at the connection point. When a flight control surface (not shown) is operatively connected to the second end 24 of the connecting rod 16, the pivoting of the connecting rod 16 at the first end 18 allows movement of the connecting rod 16 upward, causing the flight control surface to move from a first stowed position (where, for example, it is flush with an aircraft wing surface) to a second raised position, where, for example, it is extended upwardly from an aircraft wing surface.

While the disclosure has been described in detail in connection with only a limited number of examples, it should be readily understood that the disclosure is not limited to such disclosed examples. Rather, the disclosure can be modified to incorporate any number of variations, alterations, substitutions or equivalent arrangements not heretofore described, but which are commensurate with the scope of disclosure. Additionally, while various examples of the disclosure have been described, it is to be understood that aspects of the disclosure may include only some of the described examples. Accordingly the disclosure is not to be seen as limited by the foregoing description, but is only limited by the scope of the appended claims.

The invention claimed is:

1. A flight control surface actuation system comprising:
   a rotary actuator having an output part configured to rotate about an axis;
   a connecting rod for connecting a flight control surface to the rotary actuator;
   a connection mechanism connecting a first end of the connecting rod to the output part such that rotation of the output part about the axis causes at least part of the connection rod to rotate about the axis, the connection mechanism comprising: a connection structure fixed to the output part; and
   an engagement part mounted for rotation about a longitudinal axis thereof relative to the connection structure, wherein the engagement part extends through the connecting rod and is fixed thereto; and
   a position sensor arranged to measure the angular displacement of the first end of the connecting rod about the axis,
   wherein a first part of the position sensor is secured to the connection structure in a fixed position;
   wherein a second part of the position sensor is rotatably mounted to the first part and is configured to rotate with the engagement part and the connecting rod;
   wherein the position sensor is configured to measure the relative rotation between the first and second parts of the position sensor;
   wherein the engagement part comprises a first conical portion which tapers in a first axial direction;
   the first conical portion forms a first friction surface engaged with a corresponding first connecting rod friction surface.

2. The flight control surface actuation system as claimed in claim 1, wherein the connection structure comprises:
   a first arm; and
   a second arm axially spaced from the first arm,
   wherein the first and second arms extend radially outwardly from the output part, and
   wherein the engagement part extends axially between the first and second arms and is rotatably mounted to the first arm and the second arm.

3. The flight control surface actuation system as claimed in claim 2, wherein the connection mechanism comprises means for applying an axial load to the engagement part and/or to the connecting rod.

4. The flight control surface actuation system as claimed in claim 3, wherein the means for applying an axial load to the engagement part or to the connecting rod comprise means for limiting axial movement of the engagement part relative to the second arm and a nut for turning on a threaded surface of the engagement part to tighten the nut relative to the first arm.

5. The flight control surface actuation system as claimed in claim 1, wherein:
   a second conical portion axially spaced from the first conical portion is provided on the engagement part;
   the second conical portion tapers in a second axial direction opposite to the first axial direction;
   the second conical portion forms a second friction surface engaged with a corresponding second connecting rod friction surface.

6. The flight control surface actuation system as claimed in claim 5, wherein:
   the second conical portion is formed on a spacer extending between the engagement part and the connecting rod; and
   the spacer is limited in axial movement relative to the engagement part in the second axial direction.

7. The flight control surface actuation system as claimed in claim 1, wherein the longitudinal axis of the engagement part extends across the diameter of the connecting rod.

8. The flight control surface actuation system as claimed in claim 1, wherein the position sensor is mounted adjacent the connection structure such that the second part of the position sensor is configured to rotate about the longitudinal axis of the engagement part.

9. A flight control surface actuation system as claimed in claim 1, wherein the first part of the position sensor is fixed to the second arm and extends axially away from the engagement part.

10. The flight control surface actuation system as claimed in claim 1, wherein the connecting rod comprises a second end configured to be operatively connected to a flight control surface.

11. The flight control surface actuation system as claimed in claim 1, wherein the second part of the position sensor comprises a sensor shaft that is operatively connected to the connecting rod and that is rotatably mounted to the connection structure.

12. An aircraft comprising:
    at least one flight control surface; and
    a flight control surface actuation system as claimed in claim 1, wherein said connecting rod is connected to said flight control surface.

13. The aircraft of claim 12, wherein the flight control surface is a spoiler.

14. A method of controlling a flight control surface, the comprising:
    using a flight control surface actuation system as claimed in claim 1 to vary the position of a flight control surface.

* * * * *